US012571241B1

(12) United States Patent
Xu

(10) Patent No.: US 12,571,241 B1
(45) Date of Patent: Mar. 10, 2026

(54) NYLON HINGE FOR FACILITATING ADJUSTMENT OF SPRING TORQUE

(71) Applicant: Hangzhou Changsen Hardware Products Co., Ltd., Hangzhou City (CN)

(72) Inventor: Yong Xu, Hangzhou City (CN)

(73) Assignee: Hangzhou Changsen Hardware Products Co., Ltd., Hangzhou City (CN)

( * ) Notice: Subject to any disclaimer, the term of this patent is extended or adjusted under 35 U.S.C. 154(b) by 0 days.

(21) Appl. No.: 19/298,265

(22) Filed: Aug. 13, 2025

(30) Foreign Application Priority Data

May 27, 2025 (CN) ........................ 202521061577.3

(51) Int. Cl.
*E05F 1/08* (2006.01)
*E05D 5/14* (2006.01)
*E05D 7/00* (2006.01)

(52) U.S. Cl.
CPC ............ *E05D 7/0009* (2013.01); *E05D 5/14* (2013.01); *E05Y 2201/25* (2013.01)

(58) Field of Classification Search
CPC . A47F 2003/008; E05D 7/081; E05D 7/0027; E05D 7/0009; E05D 5/14; E05F 3/06; E05F 3/20; E05F 1/12; E05F 1/1223; E05F 1/1008; E05F 1/1025; E05F 1/1207; E05F 1/1215; E05F 1/14; E05F 5/06; E05Y 2201/21; E05Y 2201/224; E05Y 2201/25; E05Y 2201/41; E05Y 2201/484; E05Y 2201/492; E05Y 2201/496; E05Y 2201/702; E05Y 2201/704; E05Y 2201/71; E05Y 2600/12; E05Y 2900/132; E05Y 2900/20; E05Y 2900/202; E05Y 2900/30; E05Y 2900/40
See application file for complete search history.

(56) References Cited

U.S. PATENT DOCUMENTS 40,879 A * 12/1863 Bommer .............. E05F 1/1215 16/300
1,912,289 A * 5/1933 March .................. E05F 1/1215 16/300
2,520,616 A * 8/1950 Wasson ................ E05F 1/1215 16/300

(Continued)

FOREIGN PATENT DOCUMENTS

CN 209509868 U * 10/2019

*Primary Examiner* — Chuck Y Mah
(74) *Attorney, Agent, or Firm* — Nicholas Makridakis

(57) ABSTRACT

Disclosed in the present utility model is a nylon hinge for facilitating the adjustment of spring torque, where the nylon hinge further comprises an adjustment device, which is disposed within a first hinge mount and a second hinge mount and enables the automatic opening or closing thereof by adjusting torque. The adjustment device comprises a limiting sleeve, which is disposed within two ends of the first hinge mount and the second hinge mount, a positioning sleeve, a rotation rod, which penetrates the limiting sleeve and is used for adjusting the torque, and a torsion spring, one end of which is connected to the rotation rod, and the other end of which is connected to the positioning sleeve. By the present utility model, a rotation rod is rotated, and when the rotation rod is rotated, a torsion spring is driven to deform.

4 Claims, 5 Drawing Sheets

(56) References Cited

U.S. PATENT DOCUMENTS

| | | | | | |
|---|---|---|---|---|---|
| 3,702,491 | A * | 11/1972 | Pelletiere | E05F 1/1215 16/306 |
| 4,073,037 | A * | 2/1978 | Curry | E05D 7/1016 16/50 |
| 4,073,038 | A * | 2/1978 | Curry | E05F 1/1215 16/50 |
| 4,419,788 | A * | 12/1983 | Prout | E05F 1/1215 16/300 |
| 5,048,155 | A * | 9/1991 | Hwang | E05F 1/1215 16/301 |
| 5,584,100 | A * | 12/1996 | Doyle | E05F 1/1215 16/300 |
| 6,460,220 | B1 * | 10/2002 | Jackson | E05F 1/1215 16/374 |
| 8,683,654 | B2 * | 4/2014 | Chen | E05D 11/087 16/50 |
| 8,966,713 | B1 * | 3/2015 | Russo | E05D 7/00 16/285 |
| 2003/0014839 | A1 * | 1/2003 | Wu | E05F 1/1215 16/298 |
| 2011/0239406 | A1 * | 10/2011 | Macernis | E05F 1/1215 16/354 |
| 2014/0075720 | A1 * | 3/2014 | Caffin | E05F 1/1207 16/298 |
| 2015/0074944 | A1 * | 3/2015 | Tung | E05D 11/0054 16/251 |
| 2016/0060932 | A1 * | 3/2016 | Stuart | E05F 5/02 16/297 |
| 2017/0022743 | A1 * | 1/2017 | Timothy | E05D 7/0009 |
| 2020/0190881 | A1 * | 6/2020 | Wu | E05F 1/1025 |
| 2023/0399884 | A1 * | 12/2023 | Stuart | E05F 5/027 |

* cited by examiner

NYLON HINGE FOR FACILITATING ADJUSTMENT OF SPRING TORQUE

TECHNICAL FIELD

The present utility model relates to the technical field of hinges, and in particular to a nylon hinge for facilitating the adjustment of spring torque.

BACKGROUND

Among existing hinge products, a traditional nylon hinge is widely used across various fields due to advantages thereof, such as low cost, corrosion resistance and light weight. However, most of existing nylon hinges have the problem of it being impossible or inconvenient to adjust torque. With a nylon hinge having fixed torque, it is difficult to use a connection component of a different usage scenario. For example, for a relatively lightweight cabinet door, excessive torque may cause the cabinet door to be closed too fast, generating impact noise, and even damaging the cabinet door. For a relatively heavy component, insufficient torque may likewise result in that the component cannot be automatically closed or the component is incompletely closed. Moreover, during the use of some hinges with a spring structure, springs are prone to displacement, which affects the normal use and the service life of the hinges, thus reducing the user experience. Therefore, there is an urgent need for a nylon hinge capable of facilitating the adjustment of spring torque and having a stable structure. Thus, provided is a nylon hinge for facilitating the adjustment of spring torque.

SUMMARY

The objective of the present utility model is to provide a nylon hinge for facilitating the adjustment of spring torque in order to solve the problem.

To achieve the objective above, the following technical solution is provided. A nylon hinge for facilitating the adjustment of spring torque comprises a first hinge mount and a second hinge mount, which is rotatably connected to the first hinge mount, wherein the nylon hinge further comprises an adjustment device, which is disposed within the first hinge mount and the second hinge mount and enables the automatic opening or closing thereof by adjusting torque. The adjustment device comprises a limiting sleeve, which is disposed within two ends of the first hinge mount and the second hinge mount, a positioning sleeve, a rotation rod, which penetrates the limiting sleeve and is used for adjusting the torque, and a torsion spring, one end of which is connected to the rotation rod, and the other end of which is connected to the positioning sleeve. The torsion spring is provided at two ends with limiting rods, which are connected to the limiting sleeve and the positioning sleeve and used for limiting the radial displacement of the torsion spring. The rotation rod and the limiting sleeve are meshed with each other by perpendicular toothed surfaces, which are provided on end faces thereof.

Preferably, the first hinge mount comprises a first hinge part and a first rotation part, which are integrally formed. The second hinge mount comprises a second hinge part and a second rotation part, which are integrally formed. The first rotation part, the second rotation part and the adjustment device are disposed on the same axis.

Preferably, the first hinge part and the second hinge part are provided with several mounting holes.

Preferably, each of the positioning sleeve and the rotation rod is of a cylindrical structure, an inner wall of which is provided with several arc bosses, and a limiting groove, which fits the limiting rod, is formed between the arc bosses; and an end portion of the rotation rod is further provided with a small column, which penetrates the limiting sleeve and is internally provided with an adjustment hole.

Preferably, an end portion of each of the positioning sleeve and the limiting sleeve is provided with a column, which is connected to the first rotation part or the second rotation part, and at least one polygonal limiting step, which is used for limiting, and the limiting sleeve is internally provided with a through hole, which fits the small column on the rotation rod.

Preferably, the perpendicular toothed surfaces are respectively provided with a connection end of the small column on the rotation rod for a cylinder, and a non-cylindrical surface of the limiting sleeve.

Preferably, two ends of the first rotation part are provided with circular holes, which fit the columns on the limiting sleeve and the positioning sleeve. One end of the first rotation part is provided with a polygonal limiting groove, which fits the polygonal limiting step on the limiting sleeve and limits the axial movement of the limiting sleeve; and the other end thereof is provided with a limiting step, which limits the axial movement of the positioning sleeve.

Preferably, the second rotation part is of a cylindrical structure, one end of which is provided with a polygonal hole for limiting the axial movement of the rotation rod.

Preferably, the first hinge part and the second hinge part are each provided with a detachable cover plate.

The present utility model has the following beneficial effects: a rotation rod is rotated, and when the rotation rod is rotated, a torsion spring is driven to deform. The greater the rotation of the rotation rod, the larger the deformation of the torsion spring, and the larger the torque between the first hinge mount and the second hinge mount, such that a component which is connected to the first hinge mount and the second hinge mount and needs to realize rotation has a larger opening/closing force, thereby meeting a requirement for an opening/closing force of a hinge in different usage scenarios.

Arc bosses match limiting grooves, so as to prevent the radial movement of the torsion spring, and also prevent a torque failure of the torsion spring upon deformation. Torque applied to the rotation rod can be directly transferred to the torsion spring, thereby reducing the capacity loss.

A polygonal limiting groove and a limiting step are provided, so as to limit the axial movement of the limiting sleeve and the positioning sleeve; moreover, the polygonal limiting groove can also limit the radial rotation of the rotation rod, to which the torque is applied.

Cover plates are provided, such that exposed surfaces of a first hinge part and a second hinge part are flat and smooth, so as to prevent the exposed surfaces from scratching people, and also improve the aesthetics of a hinge.

REFERENCE SIGNS

1. first hinge mount; 11. first hinge part; 111. circular hole; 112. polygonal limiting groove; 113. limiting step; 12. first rotation part; 2. second hinge mount; 21. second hinge part; 22. second rotation part; 221. polygonal hole; 3. adjustment device; 31. limiting sleeve; 311. column 312. polygonal limiting step; 313. through hole; 32. positioning sleeve; 33. rotation rod; 331. arc boss 332. limiting groove; 333. small column; 334. adjustment hole 34. torsion spring; 341. limiting rod; 35. perpendicular toothed surface; 4. mounting hole; and 5. cover plate.

DETAILED DESCRIPTION

The nylon hinge for facilitating the adjustment of spring torque according to the present utility model will be further described below with reference to the accompanying drawings.

It should be noted that all directional indications, such as up, down, left, right, front, and back, in the embodiments of the present invention are only intended to explain a relative positional relationship, a movement status and the like between components in a specific posture (as shown in the figures). If the specific posture changes, the directional indications change accordingly.

In the present utility model, unless otherwise expressly stated or defined, the terms such as "connection" and "fixing" should be interpreted broadly, for example, "fixing" may be a fixed or detachable connection, or integration; may be a mechanical connection or an electrical connection; or may be a direct connection or an indirect connection by an intermediate medium, and may be communication between the interiors of two elements or the interaction relationship of the two elements, unless otherwise expressly defined. For a person of ordinary skill in the art, specific meanings of the above terms in the present utility model may be understood according to specific circumstances.

Figure 1:
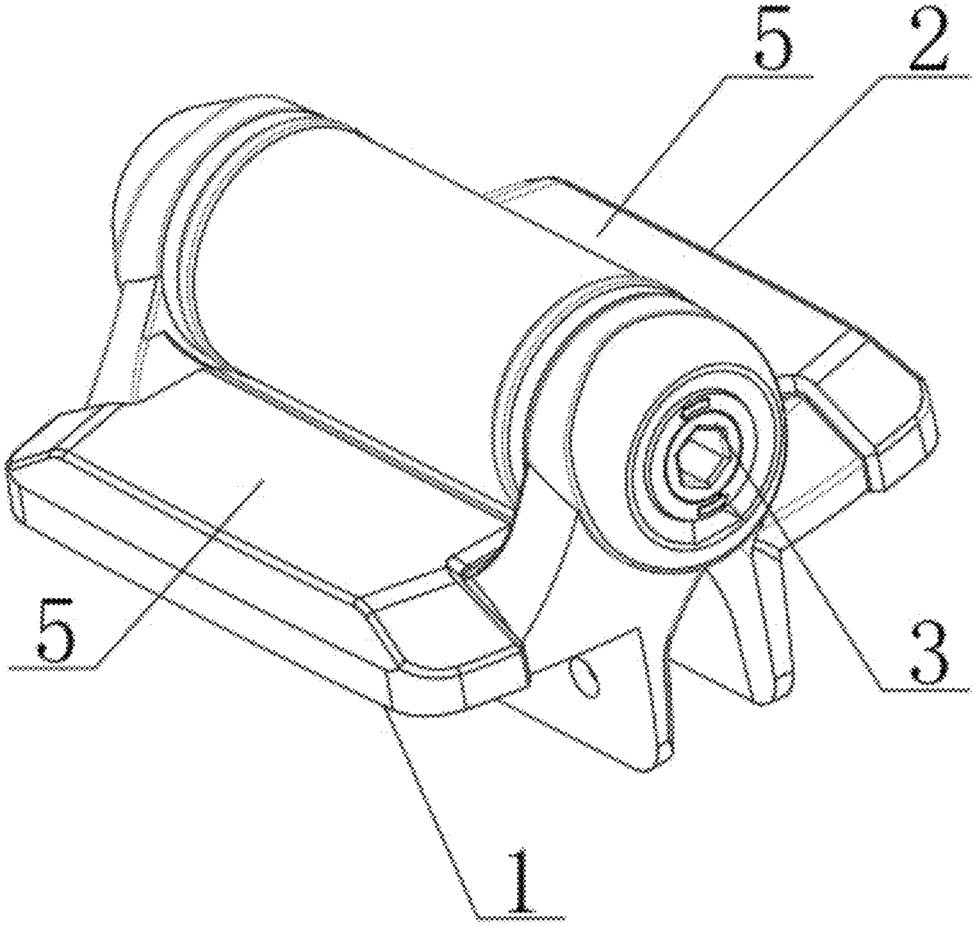
FIG. 1 is a schematic diagram of an overall structure of the present utility model.
Figure 2:
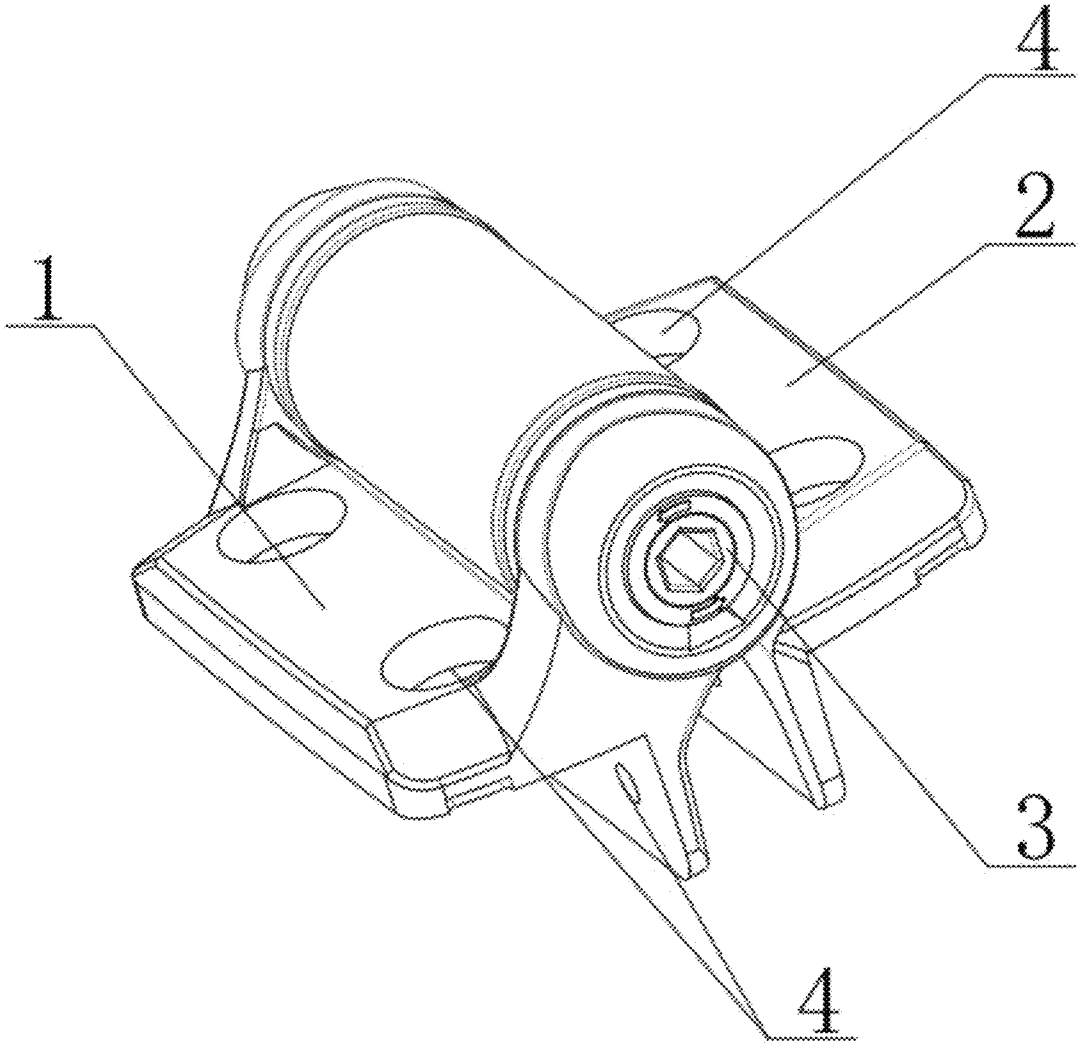
FIG. 2 is a schematic diagram of a structure of the present utility model without the mounting of cover plates.
Figure 3:
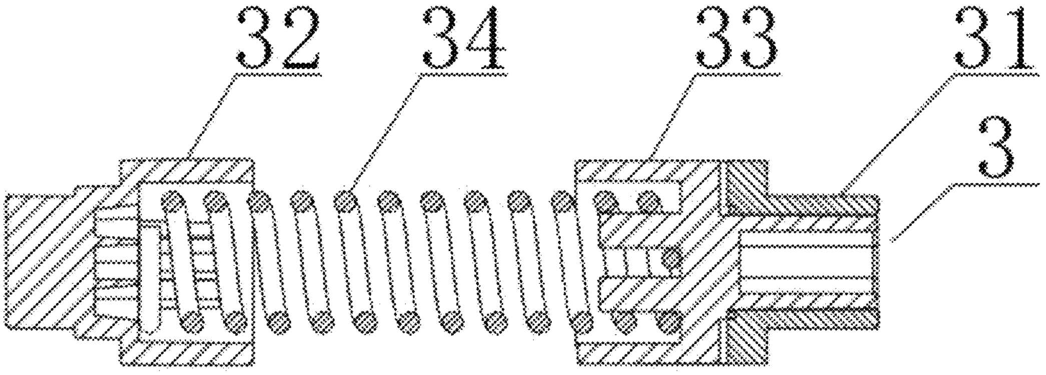
FIG. 3 is a cross-sectional view of an adjustment device of the present utility model.
Figure 4:
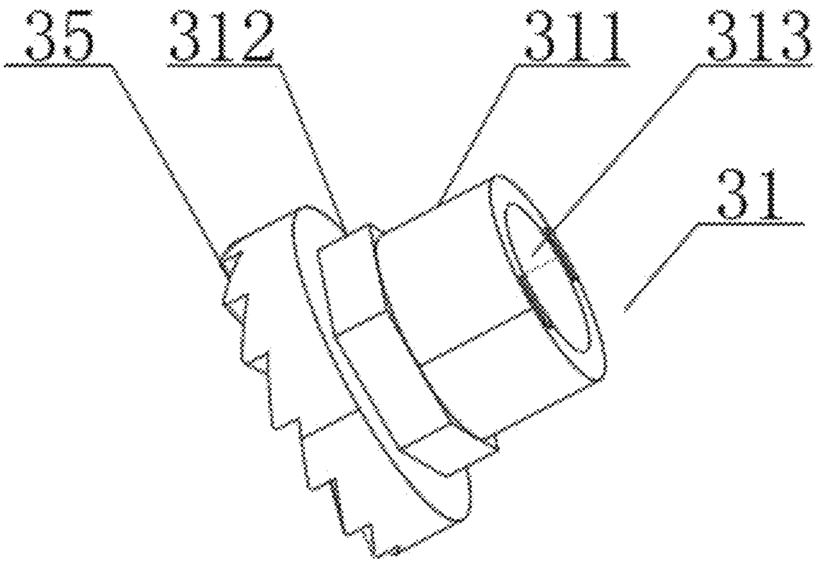
FIG. 4 is a schematic diagram of a structure of a limiting sleeve of the present utility model.
Figure 5:
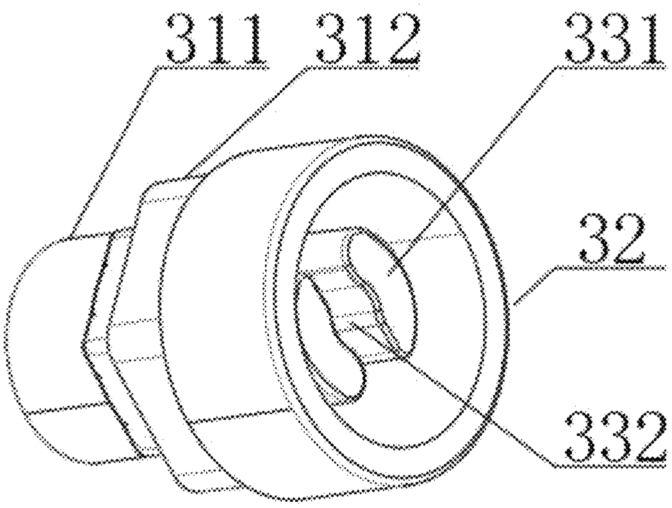
FIG. 5 is a schematic diagram of a structure of a positioning sleeve of the present utility model.
Figure 6:
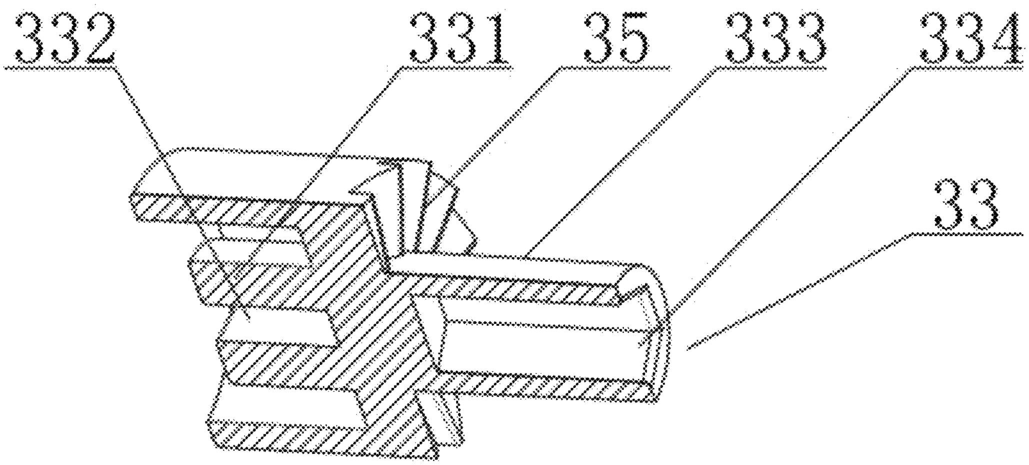
FIG. 6 is a cross-sectional view of a rotation rod of the present utility model.
Figure 7:
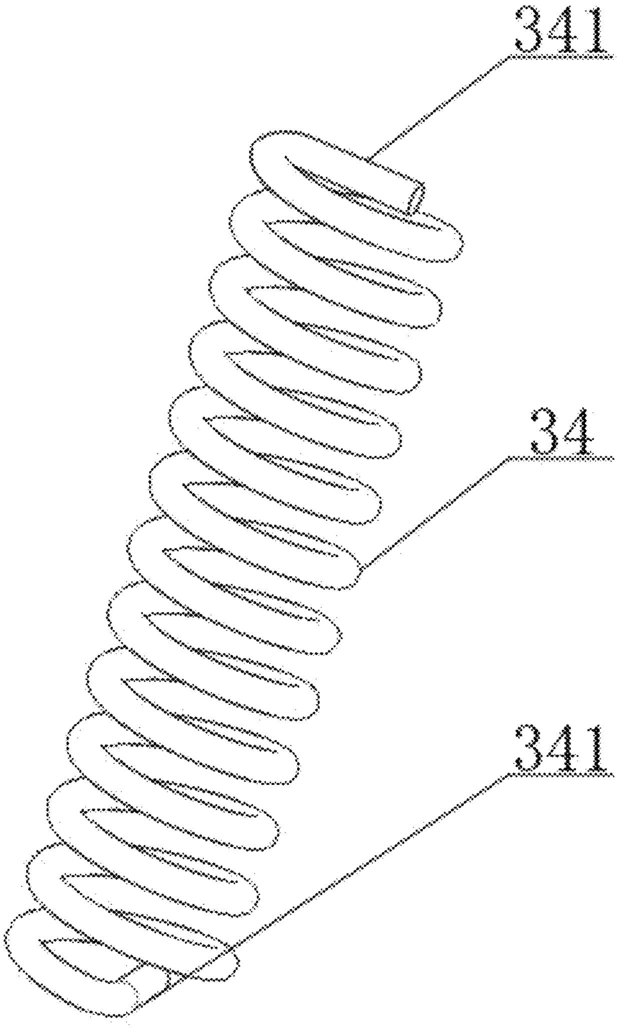
FIG. 7 is a schematic diagram of a structure of a torsion spring of the present utility model.

Referring to FIGS. 1-2, a nylon hinge for facilitating the adjustment of spring torque in the present embodiment includes a first hinge mount 1 and a second hinge mount 2, which is rotatably connected to the first hinge mount 1. The nylon hinge further includes an adjustment device 3, which is disposed within the first hinge mount 1 and the second hinge mount 2 and enables the automatic opening or closing thereof by adjusting torque. The adjustment device 3 includes a limiting sleeve 31, which is disposed within two ends of the first hinge mount 1 and the second hinge mount 2, a positioning sleeve 32, a rotation rod 33, which penetrates the limiting sleeve 31 and is used for adjusting the torque, and a torsion spring 34, one end of which is connected to the rotation rod 33, and the other end of which is connected to the positioning sleeve 32. The torsion spring 34 is provided at two ends with limiting rods 341, which are connected to the limiting sleeve 31 and the positioning sleeve 32 and used for limiting the radial displacement of the torsion spring 34. The rotation rod 33 and the limiting sleeve 31 are meshed with each other by perpendicular toothed surfaces 35, which are provided on end surfaces thereof. The rotation rod 33 is rotated, and when the rotation rod 33 is rotated, the torsion spring 34 is driven to deform. The greater the rotation of the rotation rod 33, the larger the deformation of the torsion spring 34, and the larger the torque between the first hinge mount 1 and the second hinge mount 2, such that a component which is connected to the first hinge mount 1 and the second hinge mount 2 and needs to realize rotation has a larger opening/closing force, thereby meeting a requirement for an opening/closing force of a hinge in different usage scenarios.

In an embodiment, the first hinge mount 1 includes a first hinge part 11 and a first rotation part 12, which are integrally formed. The second hinge mount 2 includes a second hinge part 21 and a second rotation part 22, which are integrally formed. The first rotation part 12, the second rotation part 22 and the adjustment device 3 are disposed on the same axis, such that the first rotation part 12 and the second rotation part 22 can be more stable during rotation.

In an embodiment, the first hinge part 11 and the second hinge part 21 are provided with several mounting holes 4, and by screws passing through the mounting holes 4, the first hinge part 11 and the second hinge part 21 are mounted onto a component, which needs to realize rotation.

In an embodiment, referring to the FIG. 3 to FIG. 7, the positioning sleeve 32 and the rotation rod 33 have a cylindrical structure, inner walls of the positioning sleeve 32 and the rotation rod 33 are provided with two facing arc bosses 331 along an axial direction of the cylindrical structure, and a limiting groove 332, which is configured to be matched with the limiting rod 341, is formed between the two facing arc bosses 331. One end of the rotation rod 33 is provided with a small column 333, which is configured to be matched with a through hole 313 of the limiting sleeve 31, and is internally provided with an adjustment hole 334. The limiting sleeve 31 is provided with a column 311 and a polygonal limiting step 312, which are configured to be matched with a circular hole 111 and a polygonal limiting groove 112 disposed on one end of the first rotation part 12, respectively. The positioning sleeve 32 is provided with a column 311 and at least one polygonal limiting step 312, which are configured to be matched with the circular hole 111 and a limiting step 113 disposed on another end of the first rotation part 12. Moreover, a perpendicular toothed surface 35 disposed on the rotation rod 33 is configured to engaged with the perpendicular toothed surface 35 disposed on the limiting sleeve 31. The arc bosses 331 are configured to be matched with the limiting grooves 332, this can ensure that the torsion spring 34 moves radially along the cylindrical structure, and also prevent a torque failure of the torsion spring 34 upon deformation. Torque applied to the rotation rod 33 can be directly transferred to the torsion spring 34, thereby reducing the capacity loss.

Figure 8:
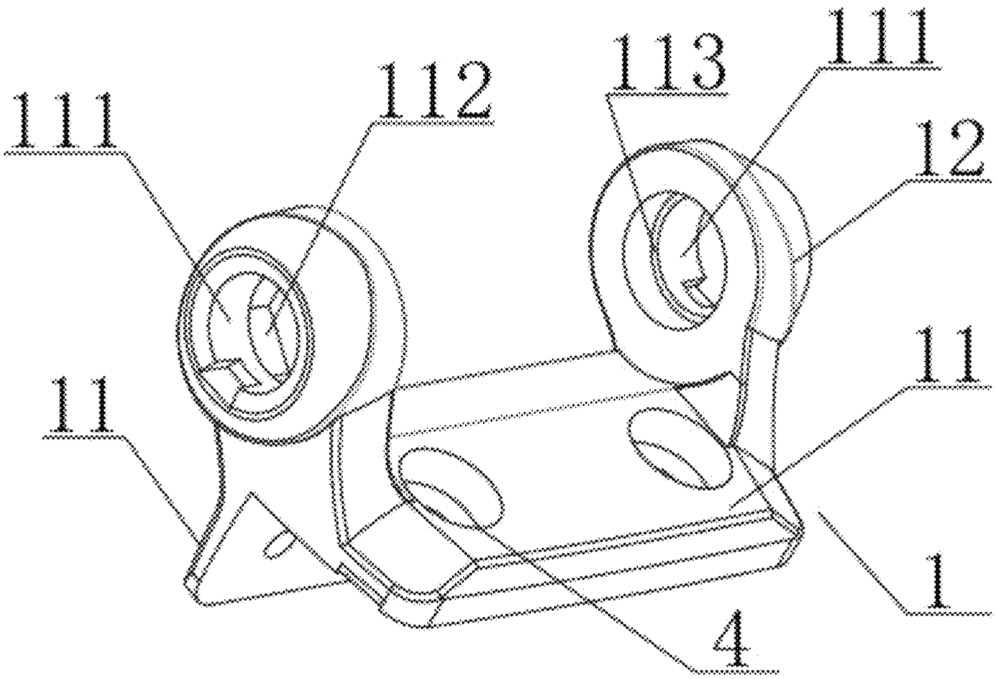
FIG. 8 is a schematic diagram of a structure of a first hinge mount of the present utility model.
Figure 9:
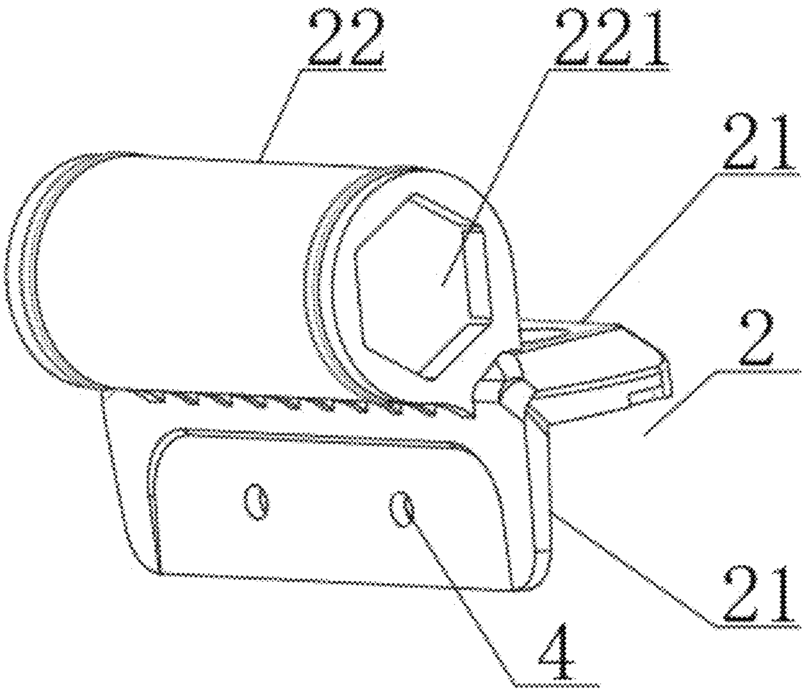
FIG. 9 is a schematic diagram of a structure of a second hinge mount of the present utility model.

In an embodiment, referring to FIG. 8 and FIG. 9, two ends of the first rotation part 12 are provided with circular holes 111, which are configured to be matched with the columns 311 disposed on the limiting sleeve 31 and the positioning sleeve 32, respectively. Moreover, one end of the first rotation part 12 is further provided with a polygonal limiting groove 112, which is configured to be matched with the polygonal limiting step 312 disposed on the limiting sleeve 31, so as to limit the axial movement of the limiting sleeve 31. And the other end of the first rotation part 12 is further provided with a limiting step 113, which is configured to be matched with the at least one polygonal limiting step 312 disposed on the positioning sleeve 32, so as to limit the axial movement of the positioning sleeve 32. The second rotation part 22 has a cylindrical structure with one end is provided with a polygonal hole 221, the adjustment device 3 is pressed into the second hinge part 22, and the positioning sleeve 32 of the adjustment device 3 is located near the polygonal hole 221.

In an embodiment, the first hinge part 11 and the second hinge part 21 are each provided with a detachable cover plate 5. The first hinge mount 1, the second hinge mount 2, the limiting sleeve 31, the positioning sleeve 32 and the rotation rod 33 are all made of a nylon material. Cover plates 5 are provided, such that exposed surfaces of the first hinge part 11 and the second hinge part 21 are flat and smooth, so as to prevent the exposed surfaces from scratching people, and also improve the aesthetics of a hinge.

When in use, the adjustment device 3 is first assembled. Two ends of the torsion spring 34 are respectively sleeved on the arc bosses 331 disposed on the rotation rod 33 and the positioning sleeve 32, and limiting rods 341 disposed on the two ends of the torsion spring 34 need to be respectively clamped into the limiting grooves 332 disposed on the rotation rod 33 and the positioning sleeve 32. And the small column 333 of the rotation rod 33 is then inserted into the through hole 313 of the limiting sleeve 31, with the perpendicular toothed surface 35 disposed on the rotation rod 33 and the perpendicular toothed surface 35 disposed on the limiting sleeve 31 are engaged with each other, such that the assembly of the adjustment device 3 is completed. Next, the assembled adjustment device 3 is pressed into the second rotation part 22 of the second hinge mount 2, with the positioning sleeve 32 of the adjustment device 3 is located near the polygonal hole 221 of the second rotation part 22.

After the assembled adjustment device 3 is pressed into the second rotation part 22, two ends of the first rotation part 12 are parallelly aligned with the second rotation part 22, and then the second rotation part 22 is pressed between the two ends of the first rotation part 12, such that the polygonal limiting groove 112 disposed on one end of the first rotation part 12 is matched with the polygonal limiting step 312 disposed on the positioning sleeve 31, and the limiting step 113 disposed on the other end of the first rotation part 12 is matched with the at least one polygonal limiting step 312 disposed on the positioning sleeve 32. In this way, the first rotation part 12, the second rotation part 22, and the adjustment device 3 are located on the same axis. After the torsion spring 34 is reset, the limiting sleeve 31 and the positioning sleeve 32 are respectively pressed into the two ends of the first rotation part 12, where the columns 311 disposed on the limiting sleeve 31 and the positioning sleeve 32 are connected to the circular holes 111 disposed on the two ends of the first rotation part 12, the polygonal limiting step 312 disposed on the positioning sleeve 32 abuts against the limiting step 113 disposed on the first rotation part 12, and the polygonal limiting step 312 disposed on the limiting sleeve 31 is clamped into the polygonal limiting groove 112 disposed on the first rotation part 12. Finally, screws is passed through the mounting holes 4 disposed on the first hinge mount 1 and the second hinge mount 2, the first hinge mount 1 and the second hinge mount 2 are mounted to a furniture that require a rotational connection, such as a cabinet door, a door, a window, and an equipment cabinet. After the installation, a cover plate 5 is installed on the first hinge part 11 and the second hinge part 21, so as to cover the exposed mounting holes 4.

When it is necessary to adjust spring torque, a tool which fits an adjustment hole 334 is used to be inserted into an adjustment hole 334 at an end portion of the rotation rod 33. During the rotation of the rotation rod 33, since the rotation rod 33 and the limiting sleeve 31 are meshed with each other by perpendicular toothed surfaces 35, it is necessary to press the rotation rod 33 inwards while same is rotated, so as to separate the two perpendicular toothed surfaces 35 from each other. The rotation of the rotation rod 33 may drive the torsion spring 34 to deform, so as to adjust torque of the torsion spring 34. The limiting rods 341 at two ends of the torsion spring 34 fit the limiting grooves 332 in the positioning sleeve 32 and the limiting sleeve 31, such that the radial displacement of the torsion spring 34 can be effectively limited. After adjustment is completed, the rotation rod 33 may not be easily rotated due to the effect of the perpendicular toothed surfaces 35, thereby ensuring the stability of the adjustment of torque. When an external force is applied to the first hinge mount 1 and the second hinge mount 2, the torsion spring 34 may generate corresponding torque, so as to realize the automatic opening or closing of the first hinge mount 1 and the second hinge mount 2. When a hinge does not need the torque, a tool with a diameter being smaller than that of the adjustment hole 334 is used to be inserted into the adjustment hole 334 and press inwards, such that the perpendicular toothed surface 35 on the rotation rod 33 is separated from the perpendicular toothed surface 35 on the limiting sleeve 31. The torsion spring 34 drives the rotation rod 33 to be automatically reset, so as to release the torque, and then, there is not torque between the first hinge mount 1 and the second hinge mount 2.

The above embodiments describe the present utility model, instead of limiting the present utility model, and any solution obtained through simple transformations of the present utility model falls within the scope of protection of the present utility model.

What is claimed is:

1. A nylon hinge for facilitating adjustment of spring torque, comprising a first hinge mount and a second hinge mount; and further comprising an adjustment device, including a limiting sleeve, a positioning sleeve, a rotation rod, and a torsion spring having two ends; wherein one end of the spring is connected to the rotation rod and another end of the spring is connected to the positioning sleeve;

wherein each of the ends of the torsion spring is provided with a limiting rod respectively connected to the rotation rod and the positioning sleeve;

wherein a perpendicular toothed surface is disposed on the rotation rod and is configured to engaged with a perpendicular toothed surface that is disposed on the limiting sleeve;

wherein the first hinge mount comprises a first hinge part and a first rotation part standing at two ends of the first hinge part, and the first hinge part and the first rotation part are integrally formed;

wherein the second hinge mount comprises a second hinge part and a second rotation part that are integrally formed, the second hinge part has a cylindrical structure, wherein one end of the cylindrical structure is provided with a polygonal hole, the adjustment device is pressed into the cylindrical structure of the second hinge part, and the positioning sleeve of the adjustment device is located near the polygonal hole;

wherein the limiting sleeve is provided with a column and a polygonal limiting step configured to be movably matched with a circular hole and a polygonal limiting groove disposed on one end of the first rotation part, respectively; and the positioning sleeve is provided with a column and at least one polygonal limiting step, wherein said column of the positioning sleeve is configured to be matched with a circular hole and supported by a limiting step that are disposed on another end of the first rotation part, and said polygonal limiting step of the positioning sleeve is configured to be located in the polygonal hole of the cylindrical structure of the second hinge part; and wherein the limiting sleeve is internally provided with a through hole that movably matches with a small column that is disposed on the rotation rod, and wherein said small column of said rotation rod is adapted to be engaged with a tool for adjustment of the spring torque.

2. The nylon hinge for facilitating adjustment of spring torque according to claim 1, wherein the first hinge part and the second hinge part are provided with several mounting holes.

3. The nylon hinge for facilitating adjustment of spring torque according to claim 1, wherein the positioning sleeve and the rotation rod have a cylindrical structure, inner walls of the positioning sleeve and the rotation rod are provided with two facing arc bosses along an axial direction along the cylindrical structure, a limiting groove is formed between the two facing arc bosses, and the limiting grooves are configured to be matched with the limiting rods that are disposed on both ends of the torsion spring.

4. The nylon hinge for facilitating adjustment of spring torque according to claim 1, wherein a detachable cover plate is provided on the first hinge part and the second hinge part.

* * * * *